(12) United States Patent
Selbach et al.

(10) Patent No.: US 7,079,258 B2
(45) Date of Patent: Jul. 18, 2006

(54) MEASUREMENT DEVICE FOR NON-CONTACT DETECTION OF OSCILLATIONS OF AN OBJECT

(75) Inventors: Helmut Selbach, Waldbronn (DE); Bernd Armbruster, Karlsruhe (DE)

(73) Assignee: Polytec GmbH, Waldbronn (DE)

( * ) Notice: Subject to any disclaimer, the term of this patent is extended or adjusted under 35 U.S.C. 154(b) by 379 days.

(21) Appl. No.: 10/736,965

(22) Filed: Dec. 16, 2003

(65) Prior Publication Data

US 2004/0125378 A1    Jul. 1, 2004

(30) Foreign Application Priority Data

Dec. 16, 2002   (EP)   ................... 02028243

(51) Int. Cl.
*G01B 9/02* (2006.01)
(52) U.S. Cl. ...................................... 356/502; 356/511
(58) Field of Classification Search ................ 356/502, 356/511, 489, 495
See application file for complete search history.

(56) References Cited

U.S. PATENT DOCUMENTS

| 4,621,263 A | 11/1986 | Takenaka et al. |
| 5,396,801 A | 3/1995 | Komura |
| 6,078,397 A * | 6/2000 | Monchalin et al. .......... 356/502 |
| 6,650,420 B1 * | 11/2003 | Houston et al. ............ 356/501 |
| 6,840,097 B1 * | 1/2005 | Huber et al. ................ 356/511 |

FOREIGN PATENT DOCUMENTS

EP   9315386   8/1993

* cited by examiner

*Primary Examiner*—Gregory J. Toatley, Jr.
*Assistant Examiner*—Patrick Connolly
(74) *Attorney, Agent, or Firm*—Volpe and Koenig, P.C.

(57) ABSTRACT

A measurement device for oscillation measurement, as well as a corresponding method, is proposed, wherein the oscillation measurement is performed by at least one laser interferometer (2, 3), whose measurement beam is directed onto various measurement points (5) of the object (1) for generating a scanning movement, and the obtained oscillation data is correlated with the position data of the respective measurement point (5) and evaluated or displayed. In particular, for three-dimensional measurements, the invention reduces the measurement complexity because the scanning device is a robot arm, which moves a measurement head of the laser interferometer to the desired measurement points on the object.

11 Claims, 1 Drawing Sheet

MEASUREMENT DEVICE FOR NON-CONTACT DETECTION OF OSCILLATIONS OF AN OBJECT

BACKGROUND

The invention relates to a measurement device as well as a method for non-contact detection of oscillations of an object. The device of the type that includes a laser interferometer, a scanning device for generating a scanning movement, a data recording device, and an evaluation or display device.

Accordingly, the measurement device comprises at least one laser interferometer, at least one scanning device, which directs the measurement beam of the laser interferometer onto different measurement points of the object for generating a scanning motion, a data recording device, which interacts with the laser interferometer and with the scanning device in order to correlate the oscillation data measured by the laser interferometer with position data of each measurement point, as well as a display or evaluation device for position-matched display or evaluation of the oscillation data correlated with the position data.

Oscillations, especially vibrations, are conventionally measured by applying acceleration sensors onto the surface of the object and evaluating the signals of these sensors in correlation with the position data of the respective measurement points. However, very often such acceleration sensors cannot be used. For example, if very small structures, such as wires or write and read heads of hard disks, are to be measured, if the objects are very hot or very cold, or whenever the mass of the acceleration sensor produces inaccurate results for the oscillation mode of the object, particularly for lightweight objects and for soft structures, conventional sensors are not used. In addition, rotating objects, such as, e.g., hard disk drives, wheels of motor vehicles, or brake discs, cannot be measured with conventional acceleration sensors.

Therefore, optical methods for detecting oscillations of objects have been available for some time, because these methods enable measurements to be performed without mechanical contact with the object. Here, in particular, the optical measurement of the object by means of a laser interferometer offers not only an advantageously high measurement sensitivity, but also a wide bandwidth of the oscillation modes to be measured. Generally, a laser-Doppler vibrometer is used with a measurement point on the object being illuminated with coherent laser light. The oscillation movement of the object surface causes a Doppler shift in the frequency of the light reflected from the surface. An analysis of the frequency shift provides the desired oscillation data, because the respective velocity values can be calculated from the frequency shift. In addition, the acceleration values of the object at the measurement point can also be calculated from the progression of the velocity values. The principle setup of such a measurement device is described, e.g., in the German technical journal *Technisches Messen—tm,* 57 (1990), pp. 335–345.

A measurement device of the class mentioned above is known, e.g., from WO 93/15386. More specifically, this document describes how a scanning laser-Doppler vibrometer can be used for detecting the oscillation conditions of an object. The scanning device in this document is integrated in a measurement head of the interferometer and essentially consists of a moving deflection mirror for the laser beam. This deflection mirror helps to direct the laser beam in a scanning motion onto different measurement points of the object. This technology is widely used and is unproblematic in itself.

In many applications, it is necessary to detect the oscillation conditions of the individual measurement points not only in one dimension, that is, along the direction of the measurement beam, but also to record oscillation data for the measurement points in all three spatial directions. For such three-dimensional measurements, WO 93/15386 proposes to use three laser-Doppler vibrometers with measurement beams, which are aimed from different spatial directions onto the respective measurement points in order to be able to ultimately record three-dimensional oscillation data.

However, the deflection mirrors for the laser beams must be carefully synchronized, which is already rather complicated in itself. In addition, if the measurement points lie far apart from each other or even if a curved surface of the object is to be measured, then the focus for the individual measurement points must be changed continuously. Furthermore, it is not possible to measure at points that do not lie in the direct scanning region of the deflection mirror for the laser beams.

SUMMARY

Therefore, it is an object of the present invention to provide an improved measurement device of the class mentioned above, as well as to provide a corresponding method, especially in terms of the scanning process used to direct the measurement beams onto different measurement points on the object.

This object is achieved by a measurement device for non-contact detection of oscillations of an object, comprising at least one laser interferometer, a scanning device, which directs a measurement beam of the at least one laser interferometer onto various measurement points of the object for generating a scanning movement, a data recording device, which interacts with the laser interferometer and with the scanning device in order to correlate oscillation data measured by the at least one laser interferometer with position data of the respective measurement point obtained from the scanning device, and an evaluation or display device for position-matched evaluation or display of the oscillation data correlated with the position data, wherein the scanning device comprises a program-controlled, moving support, on which at least one measurement head of the at least one laser interferometer is mounted and with which the at least one measurement head can be moved to the various measurement points, wherein the scanning device is programmed so that the at least one measurement head of the laser interferometer moves to the individual measurement points at a preselected distance to the object.

Advantageous configurations of the measurement device according to the invention also comprise the use of a laser-Doppler vibrometer, wherein for each measurement point, the at least one laser interferometer generates three measurement beams that are incident on the object from different angles. The three measurement beams have an aperture angle between them that is at least more than 12°, preferably greater than 20°. The position data of the measurement points present in the scanning device can be presented within the video image of the of the measurement object, particularly in the foreground of the video image on the display device. The display device and the scanning device interact such that the position data of the measurement points of the scanning device can be freely selected with reference to the video image of the object on the display device. The support arm of an industrial robot may serve as the support. Alternatively, the support may be formed from the positioning elements of a gantry robot.

Also provided is a method for non-contact detection of oscillations of an object, comprising the steps of: directing at least one measurement beam of at least one laser interferometer onto various measurement points on the object; detecting oscillation data obtained from the at least one laser interferometer and correlating the oscillation data with position data of the measurement points; displaying and/or evaluating the oscillation data correlated with the position data, wherein at least one measurement head of one or more laser interferometers mounted on a program-controlled, moving support is moved by means of the support to the measurement points and is moved to the individual measurement points at a preselected distance to the object.

Thus, the invention differs from the prior state of the art fundamentally in that the scanning motion is generated by a program-controlled, moving support, especially the support arm of an industrial robot or the positioning elements of a gantry robot. At least one measurement head of one or more laser interferometers is mounted on this support. The term "scanning device" used for the present invention comprises not only the program-controlled support or the robot, but also its controller with the necessary program routines and data memories, just like the scanning device in the state of the art comprises not only the deflection mirror, but also its control devices. Thus, for a device according to the invention, a computer can interact, e.g., on one hand with an industrial robot and on the other hand with a laser-Doppler vibrometer, wherein the computer then contains both the data recording device and also parts of the scanning device, namely its controller.

The moving support moves the measurement head to the various measurement points, preferably so that a preselected distance to the object is maintained at each measurement point. Here, in each case it is not necessary to use additional devices for range measurement, namely when the position data of the measurement points can be calculated from data, which is already present in the controller of the scanning device and which originates from numeric structural data of the measurement object.

In addition to the enormous advantage produced through a possibly fixed working distance, which makes changing the focus unnecessary, now for the first time complex object surfaces can also be tested interferometrically for their oscillation behavior. Also back cuts or overhangs, as well as surfaces guided around a bevel, can be measured through corresponding movements of the support arm or the program-controlled support.

In particular, a three-dimensional measurement provides no more special difficulties because the support according to the invention can hold three measurement heads in a fixed mutual relationship and can be guided to the respective measurement points. Obviously, it is also possible to use one individual measurement head with three laser beams directed in different spatial directions onto the measurement point, or else, which makes the construction especially simple, one individual measurement head with only one laser beam that is steered in close chronological succession from three different spatial directions one after the other onto the same measurement point. The imaging errors present in the state of the art for three-dimensional measurements, especially in the edge regions of the surfaces to be scanned, are completely eliminated with the invention, because the program-controlled moving support can always move the three measurement heads at an optimum distance and optimum orientation to the measurement points.

To achieve optimum results, it has proven to be advantageous to select the beam aperture angle between the three measurement beams necessary for three-dimensional measurements greater than 20°, but at least greater than 12°.

Special advantages result when the scanning device according to the invention and the data recording device interact with a display device, which shows a video image of the measurement object and represents the position data of the measurement points in the foreground of this video image. In particular, this makes it possibly to freely preselect the position data of the measurement points with reference to the video image of the measurement object and if necessary to program these points into the controller of the scanning device using the teach-in method, which requires a program-controlled moving support in order to be able to move the measurement head or the measurement heads to the individual measurement points. This guarantees not only an intuitive operation of the measurement device, but also enables the measurement point grid to be adapted specifically to the profile of the object surface and the critical fields, lines, or points of the object.

BRIEF DESCRIPTION OF THE DRAWINGS

An embodiment of the invention is described in more detail in the following with reference to the accompanying drawings. Shown are.

DETAILED DESCRIPTION OF THE PREFERED EMBODIMENTS

Figure 1:
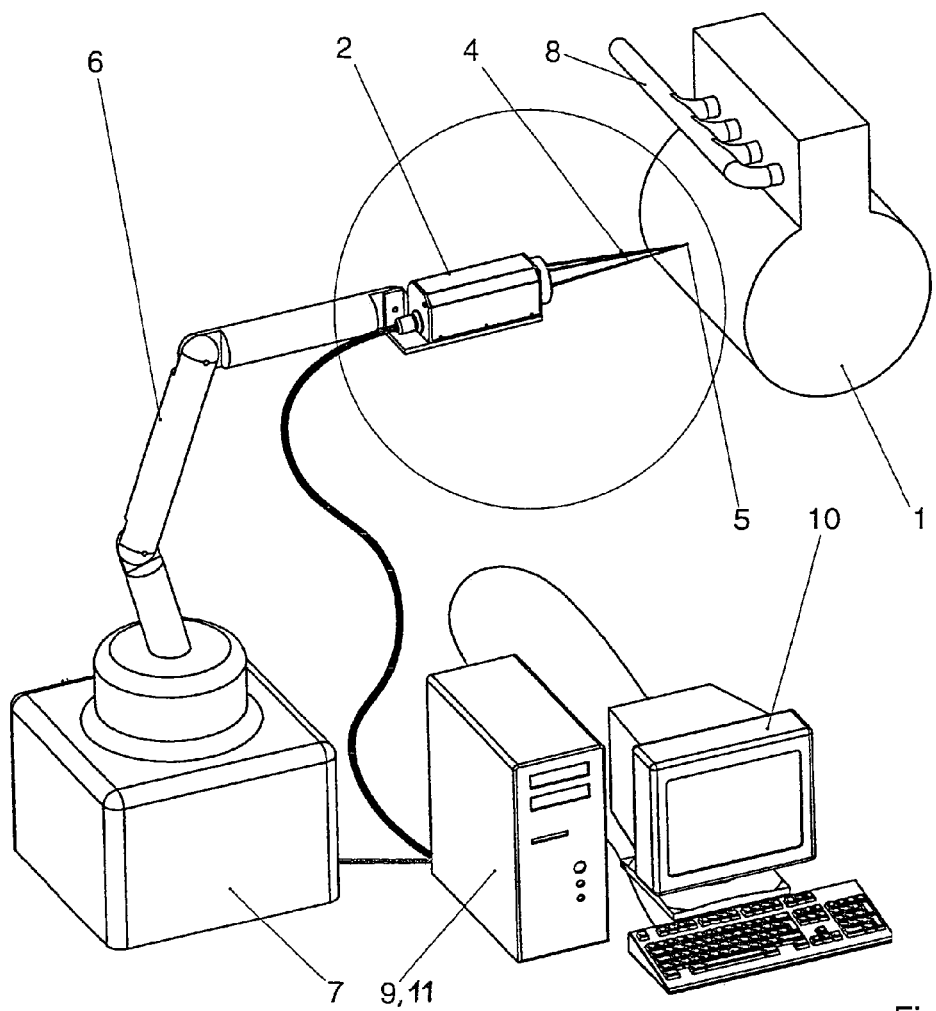
FIG. 1, a first embodiment of the invention in a schematic representation.

FIG. 1 shows a measurement device according to the invention, which measures oscillations of an engine block 1 of a motor vehicle. A laser-Doppler vibrometer 2 with a total of three measurement heads 3, which each steer a measurement beam 4 onto a measurement point 5 on the object, is mounted on a support arm 6 of an industrial robot 7 and can be directed from this onto a wide range of points on the engine block 1—even behind the exhaust manifold 8 by selecting suitable incidence angles. Thus, the distance between the laser-Doppler vibrometer 2 and the respective measurement points 5 always remains constant. Because the three measurement heads 3 are fixed in their arrangement in the housing of the laser-Doppler vibrometer 2, absolutely no differences in the focus or in the intersection angle of the individual measurement beams 4 on the respective measurement point 5 result during scanning, so that the scanning movement is performed significantly more simply relative to the prior state of the art, wherein in addition, the need for correction during evaluation decreases significantly.

Figure 2:
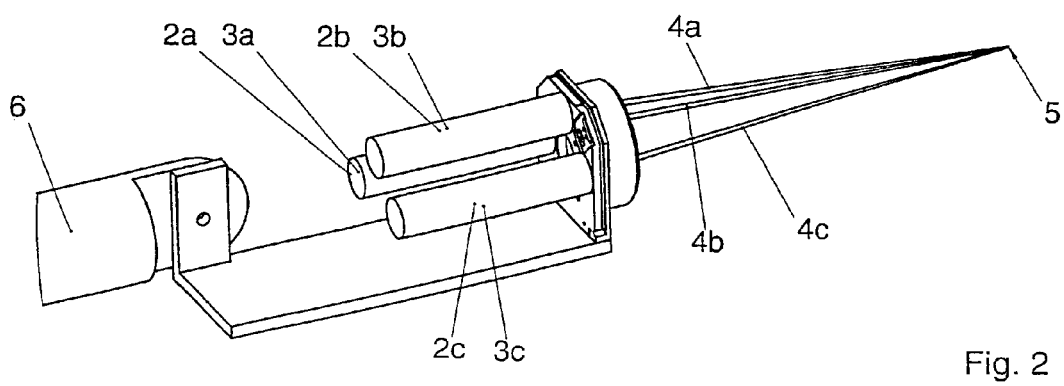
FIG. 2, a second embodiment in a schematic, detailed representation.

FIG. 2 shows another embodiment. Here, three separate measurement heads 3a, 3b, and 3c direct the measurement beams 4a, 4b, 4c onto the respective measurement point 5. Here, the measurement heads 3a, 3b, 3c are also mounted in a fixed mutual arrangement on the support arm 6. They are moved by this arm to the individual measurement points 5 so that the initial geometric conditions, such as the distance between the measurement head and measurement point, as well as the opening angle of the measurement beams 4a, 4b, 4c, each remain identical. As this directly illustrates, the invention demonstrates its great potential for simplification, especially for three-dimensional oscillation measurements. However, the possibility of being able to measure objects with complex surfaces also offers great advantages relative to the prior state of the art.

In addition to the measurement devices shown in FIGS. 1 and 2 for three-dimensional measurement of oscillations of the engine block 1, a three-dimensional measurement can also be performed according to the invention such that only one laser-Doppler vibrometer is mounted with only one measurement beam on the support arm 6 of the industrial robot 7 and is directed from different spatial directions one after the other onto the measurement point 5. Correlating these three measurements recorded one after the other allows a three dimensional evaluation of the oscillation behavior at the measurement point 5.

As shown again in FIG. 1, the controller 11 of the support arm 6 of the industrial robot 7 reports the position coordinates of the measurement points 5 to a data recording device 9, which is connected to the laser-Doppler vibrometer 2 (indicated by a dashed line) for reading the oscillation data. A conventional computer simultaneously functions as a data recording device 9, controller 11 of the scanning device, as well as evaluation device, and forwards the data to a display device 10, with or without pre-processing. Simultaneously, the operator can select individual measurement points 5 or groups of measurement points, which are fed back again to the controller 11 of the industrial robot 7, on a video image of the object displayed on a display device 10. The industrial robot 7 can also be programmed locally by manually moving the support arm 6 to selected measurement points 5 and then storing the resulting positions in the controller 11. If the geometry data of the engine block 1 is known and read into the controller 11 of the industrial robot 7, this process can also be automated. The operator then only has to select measurement points 5 or groups of measurement points on the display device 10.

The invention claimed is:

1. A measurement device for non-contact detection of oscillations of an object, comprising at least one laser interferometer (2, 3), a scanning device (6, 7, 11), which directs a measurement beam (4) of the at least one laser interferometer (2, 3) onto various measurement points (5) of the object (1) for generating a scanning movement, a data recording device (9), which interacts with the laser interferometer (2, 3) and with the scanning device (6, 7, 11) in order to correlate oscillation data measured by the at least one laser interferometer (2, 3) with position data of the respective measurement point (5) obtained from the scanning device (11), and an evaluation or display device (10) for position-matched evaluation or display of the oscillation data correlated with the position data, wherein the scanning device comprises a program-controlled, moving support (6), on which at least one measurement head (3) of the at least one laser interferometer is mounted and with which the at least one measurement head (3) can be moved to the various measurement points (5), wherein the scanning device (6, 11) is programmed so that the at least one measurement head (3) of the laser interferometer moves to the individual measurement points (5) at a preselected distance to the object (1).

2. A measurement device according to claim 1, wherein the at least one laser interferometer is a laser-Doppler vibrometer.

3. A measurement device according to claim 1, wherein for each of the measurement points (5), the at least one laser interferometer generates three measurement beams (4a, 4b, 4c) that are incident on the object (1) from different angles.

4. A measurement device according to claim 3, wherein the at least one laser interferometer comprises three laser-Doppler vibrometers.

5. A measurement device according to claim 3, wherein a beam aperture angle between the three measurement beams (4a, 4b, 4c) is greater than 12°, preferably greater than 20°.

6. A measurement device according to claim 1, wherein the position data of the measurement points (5) present in the scanning device (11) can be represented in a foreground of a video image of the object (1) on the display device (10).

7. A measurement device according to claim 6, wherein the display device (10) and the scanning device (6, 7, 11) interact such that the position data of the measurement points (5) present in the scanning device (11) can be freely selected with reference to the video image of the object (1).

8. A measurement device according to claim 1, wherein the support (6) is a support arm of an industrial robot (7).

9. A measurement device according to claim 1, wherein the support (6) is formed from positioning elements of a gantry robot.

10. A method for non-contact detection of oscillations of an object, comprising the steps of:
    directing at least one measurement beam of at least one laser interferometer onto various measurement points on the object;
    detecting oscillation data obtained from the at least one laser interferometer and correlating the oscillation data with position data of the measurement points;
    displaying and/or evaluating the oscillation data correlated with the position data,
    wherein at least one measurement head of one the at least one laser interferometer is mounted on a program-controlled, moving support, and moving the at least one measurement head to the measurement points using the moving support so that the at least one measurement head is moved to the individual measurement points at a preselected distance to the object.

11. A method according to claim 10, wherein a video image of the object is generated and the measurement points are selected with reference to the video image.

* * * * *